UNITED STATES PATENT OFFICE.

PAUL R. HERSHMAN, OF CHICAGO, ILLINOIS, ASSIGNOR TO THE MINERAL PRODUCTS COMPANY, OF NEW YORK, N. Y., A CORPORATION OF WEST VIRGINIA.

FIXATION OF NITROGEN.

1,188,651. Specification of Letters Patent. Patented June 27, 1916.

No Drawing. Application filed December 21, 1914. Serial No. 878,315.

*To all whom it may concern:*

Be it known that I, PAUL R. HERSHMAN, a subject of the Empire of Austria-Hungary, residing in the city of Chicago, county of Cook, State of Illinois, have invented certain new and useful Improvements in Fixation of Nitrogen; and I do hereby declare the following to be a full, clear, and exact description of the invention, such as will enable others skilled in the art to which it appertains to make and use the same.

It has heretofore been proposed to obtain aluminum nitrid by the nitrification of alumina, and processes have been devised for that purpose, which, in general, have required the employment of temperatures so high as to be difficult of realization commercially, and which impose more than ordinary demands upon the apparatus contemplated for the purpose. These inherent difficulties of the former practice are particularly marked in the higher ranges of temperature to which, in the former practice, it has been found necessary or desirable to raise the charge to be nitrified; but, in so far as I am aware, effective nitrification in amount remunerative commercially has not heretofore been found feasible at temperatures below 1800° C. I believe that this characteristic difficulty encountered in the nitrification of alumina is attributable in large part to the physical condition of the alumina heretofore treated, which has usually been derived from bauxite or the like, and is relatively dense, impermeable, and of high heat resistivity.

The present invention is based upon the discovery that it is feasible to obtain the practically complete nitrification of aluminiferous material, if the aluminiferous material is derived from alunite, which is first calcined to deprive it of its sulfur and of the major part of its potash content, the potash being removed to the desired degree (either by volatilization, or by leaching the calcined alunite) before the nitrification is begun.

The amount of potash which remains in the calcined alunite at the beginning of the nitrification usually varies from say .5%–1% by weight and represents no material loss in the operation. On the other hand, it apparently assists in hastening the speed of the reaction at the temperatures employed. Particularly, also, the relatively porous character of the calcined alunite, and its lesser density per unit of volume are factors which apparently assist in the speed with which the nitrification is effected and the completeness of the nitrification at temperatures which, in this art, may be regarded as moderate.

In practice, the calcined alunite, together with the necessary quantity of carbon to bring it into condition for nitrification is raised to a nitrifying temperature in the presence of a suitable source of nitrogen, as, for instance, nitrogen derived from the air, or from some other convenient source, or present in producer gas. The nitrifying temperature for the charge may be obtained in any suitable manner, as, for instance, by heat transmitted to the charge by conduction, convection, radiation, or the like, in an electric furnace of the resistance type or of the electric arc type, or in a chamber heated by furnace gases (particularly a furnace of the regenerator type wherein the nitrifying gas itself is adapted to be raised to the necessary temperature for maintaining nitrifying conditions within the charge).

The nitrifying temperature which I have found sufficient for effecting the practically complete nitrification of the calcined alunite is 1650° C., which is readily obtainable and which can be maintained in ordinary apparatus without imposing excessive demands upon its capabilities of use.

The alunite to be calcined differs somewhat in composition according to the locality at which it is mined, and individual specimens taken even from the same locality have minor differences in composition. A typical alunite, appropriate to the uses of the invention may, however, be assumed to be represented by the following general formula: $Al_2O_3$, 37.18; $Fe_2O_3$, trace; $SO_3$, 38.34; $P_2O_5$, .58; $K_2O$, 10.46; $Na_2O$, .33; $H_2O+$, 12.90; $H_2O-$, .09; $SiO_2$, .22.

After calcination, as hereinbefore indicated, the sulfur is driven off, together with the major part of the potash, and also minor portions of the other foreign ingredients, leaving a residue, from which the potash may be removed, to the desired extent either by volatilization, or by leaching.

It is found that the nitrifying temperature employed has no fusing or sintering effect upon the calcined alunite and that it remains, during nitrification, in a condition peculiarly adapted to the exercise of its function in the fixation of the nitrogen present.

It is a further characteristic of the employment of calcined alunite as one of its ingredients of the charge that any portion of the alunite constituent of the charge which may have escaped nitrification is nevertheless converted, at the temperatures prevailing during the fixation operation, into a condition in which it is soluble in boiling alkali. It is therefore feasible to dissolve the residual calcined alunite from the fixation operation, in a boiling solution of caustic soda, for instance, in which the solution contains from say 2 to 2¼ parts of sodium hydroxid for each part of the residual calcined un-nitrified aluminum constituent, which latter usually consists of alkali-soluble alumina and alkali-soluble carbid. By this expedient, the said residual material is put in a condition in which it can be readily treated by the Beyer process, or the like, for its recovery as commercially pure alumina.

What I claim is:

1. The method of producing aluminum nitrid, which comprises calcining a body of alunite, removing the major part of the potash contained in the calcined product, and then subjecting the product together with carbon to the necessary temperature for nitrogen fixation and supplying thereto the nitrogen to be fixed.

2. The method of producing aluminum nitrid, which comprises calcining a body of alunite, removing by volatilization the major part of the potash contained in the calcined product, and then subjecting the product together with carbon to the necessary temperature for nitrogen fixation and supplying thereto the nitrogen to be fixed.

3. The method of producing aluminum nitrid, which comprises heating calcined alunite freed from the major portion of its potash content with carbon and nitrogen to the necessary temperature for nitrogen fixation.

4. The method of producing aluminum nitrid, which comprises heating calcined alunite freed from the major portion of its potash content with carbon and nitrogen to a temperature of about 1650° C.

In testimony whereof I affix my signature, in presence of two witnesses.

PAUL R. HERSHMAN.

Witnesses:
  M. Ames,
  M. A. Bill.